United States Patent
Lee et al.

(10) Patent No.: US 7,578,456 B2
(45) Date of Patent: Aug. 25, 2009

(54) METHOD FOR PREPARING MICRON-SIZED GINSENG POWDER VIA MECHANICAL GRINDING

(75) Inventors: Geun Lee, Seoul (KR); Kang-Pyo Lee, Seoul (KR); Hyun-Soon Sung, Seoul (KR); Yong-Ki Seo, Seoul (KR); Dong-Joon Kim, Goyang-si (KR); Tae-Soo Seo, Daejeon (KR)

(73) Assignee: CJ Cheiljedang Corp., Seoul (KR)

( * ) Notice: Subject to any disclaimer, the term of this patent is extended or adjusted under 35 U.S.C. 154(b) by 11 days.

(21) Appl. No.: 11/662,840

(22) PCT Filed: Sep. 1, 2005

(86) PCT No.: PCT/KR2005/002902

§ 371 (c)(1),
(2), (4) Date: Mar. 14, 2007

(87) PCT Pub. No.: WO2006/031026

PCT Pub. Date: Mar. 23, 2006

(65) Prior Publication Data

US 2008/0210789 A1    Sep. 4, 2008

(30) Foreign Application Priority Data

Sep. 15, 2004    (KR)  ............... 10-2004-0073798

(51) Int. Cl.
*B02C 19/00* (2006.01)
(52) U.S. Cl. ............................. 241/5; 241/29
(58) Field of Classification Search ............ 241/5, 241/29
See application file for complete search history.

(56) References Cited

U.S. PATENT DOCUMENTS

| | | | | |
|---|---|---|---|---|
| 5,718,954 | A | * | 2/1998 | Sano et al. ............ 428/35.6 |
| 2003/0146311 | A1 | * | 8/2003 | Yang ........................ 241/3 |
| 2004/0161524 | A1 | * | 8/2004 | Sakai et al. ............. 426/655 |
| 2004/0202627 | A1 | * | 10/2004 | Kuroda et al. ............. 424/63 |

FOREIGN PATENT DOCUMENTS

| | | |
|---|---|---|
| CN | 1083663 | 3/1994 |
| EP | 0937410 | 8/1999 |
| JP | 408333269 | * 12/1996 |
| JP | 2003-268121 | 9/2003 |
| KR | 20010079283 | 8/2001 |
| KR | 20030030419 | 4/2003 |
| WO | WO 9428056 | 12/1994 |
| WO | WO 03000074 | 1/2003 |
| WO | WO 2004045585 A1 | 6/2004 |

* cited by examiner

*Primary Examiner*—Mark Rosenbaum
(74) *Attorney, Agent, or Firm*—Porzio, Bromberg & Newman, P.C.

(57) ABSTRACT

Disclosed is a method for preparing micron-sized ginseng powder via mechanical grinding, the method comprising the steps of: grinding ginseng roots crudely in order to facilitate micro-pulverization of ginseng, grinding the crude ginseng powder finely, and further grinding the ginseng powder ultrafinely. The ginseng micropowder obtained from the method has a maximum particle diameter of 40 μm or less, an average particle diameter of less that 8 μm and a uniform particle size, and thus shows excellent dispersibility, miscibility and absorptiveness. Therefore, the micropowder can be used for manufacturing various health-aid foods or medicines such as drinks, tablets or capsules and cosmetic products such as functional skin care agents or skin packs.

5 Claims, 3 Drawing Sheets

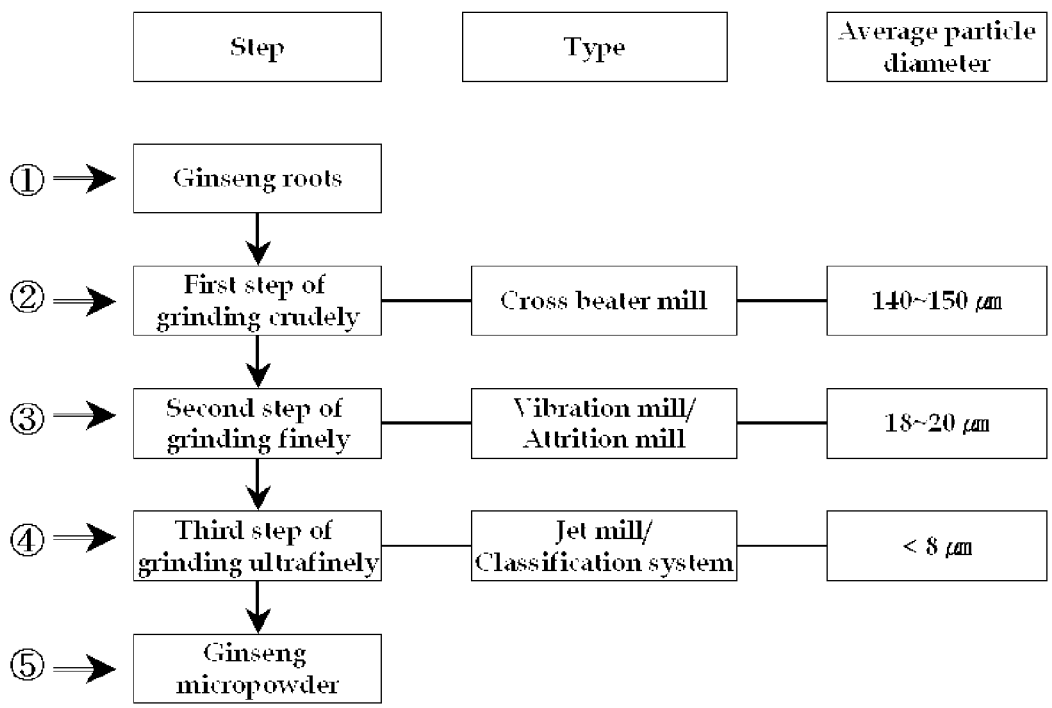

[Fig. 3]
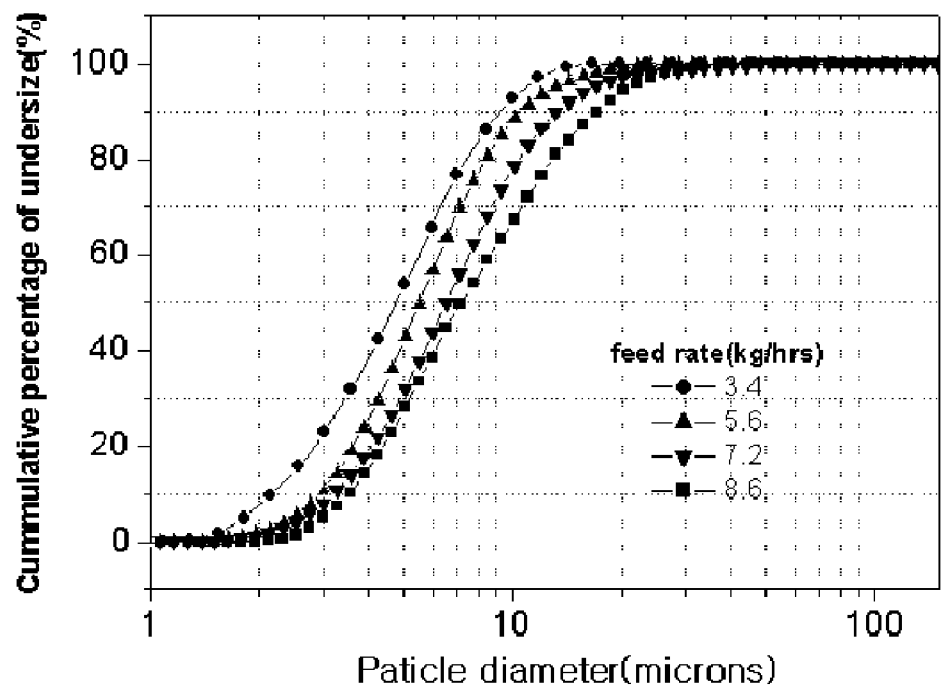
[Fig. 4]
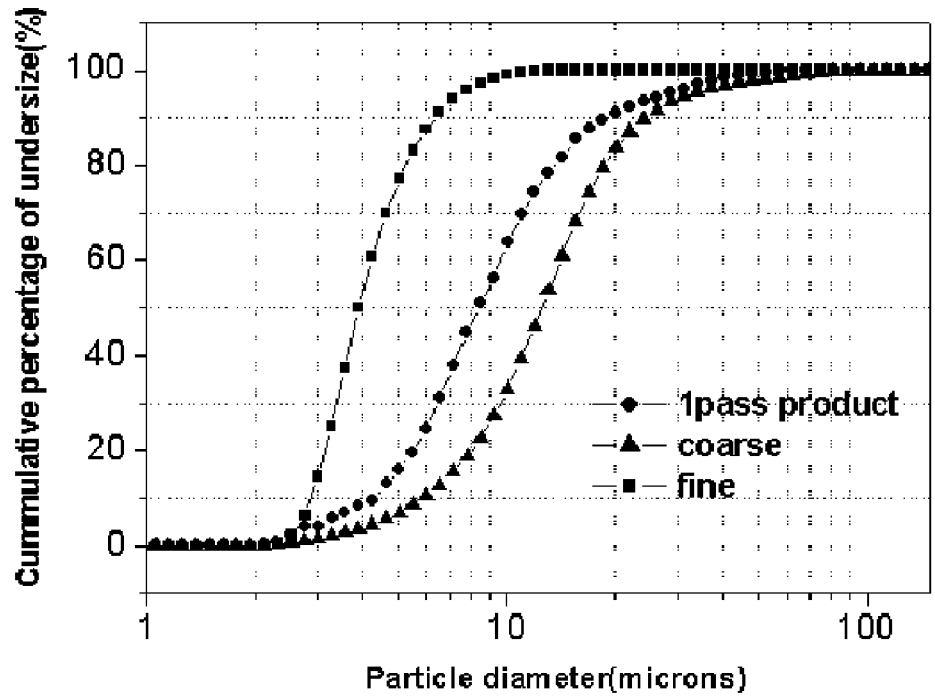

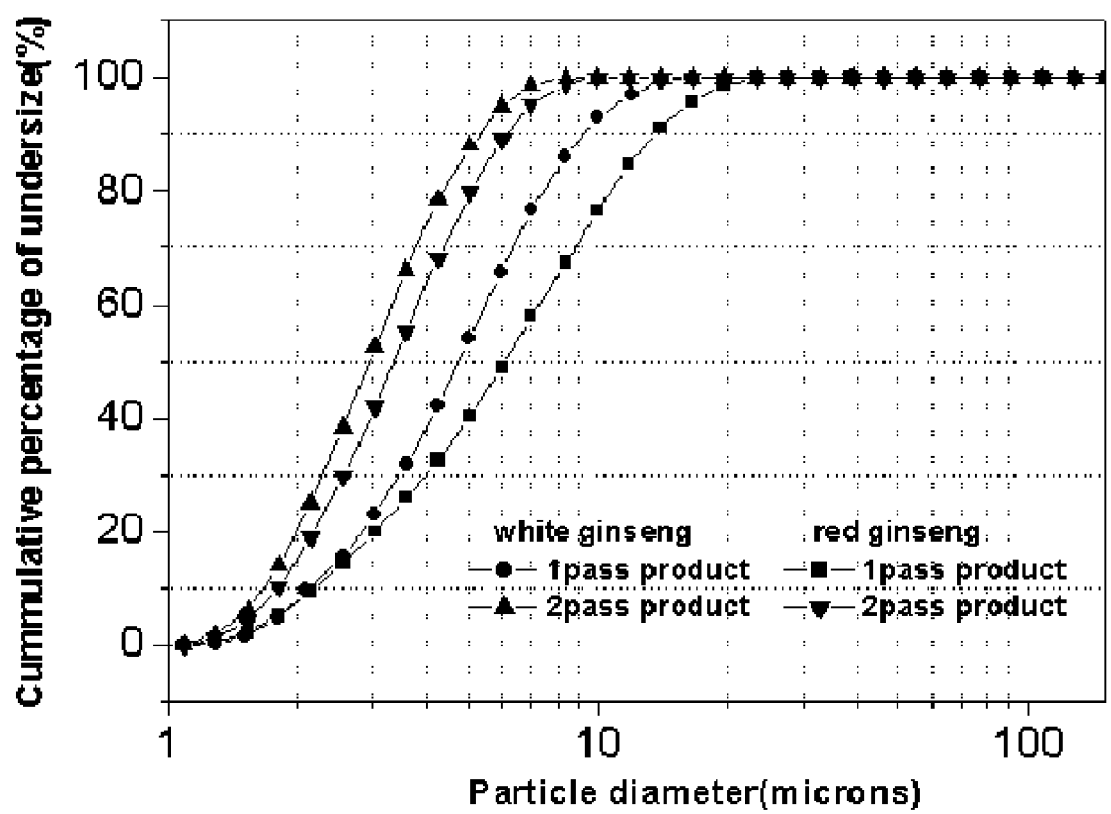
[Fig. 5]

METHOD FOR PREPARING MICRON-SIZED GINSENG POWDER VIA MECHANICAL GRINDING

TECHNICAL FIELD

The present invention relates to a method for preparing micron-sized ginseng powder via mechanical grinding. More particularly, the present invention relates to a method for preparing micron-sized ginseng powder having a fine and uniform particle size, which is useful for manufacturing various health-aid foods or medicines such as drinks, tablets or capsules and cosmetic products such as functional skin care agents or skin packs, via a mechanical grinding process including systematic processing steps.

BACKGROUND ART

Ginseng is one of the most important medicinal herbs taking deep root in Korean daily life in such a degree that Korea is called as suzerain state of ginseng. Ginseng has been regarded as miraculous panacea in the Chinese medical field through all ages. The effects of ginseng have been recognized all over the world, including the China at early times and Europe and America recently. Finally, ginseng has taken a position as the trademark of Korea.

Although modern medical science is developed to the highest degree nowadays, internal treatment often depends on the Chinese medical science, and thus ginseng is increasingly on demand. Additionally, intensive research and development into ginseng, particularly into its essential components and effects are made by western medical scientists due to the specific functions of ginseng. Therefore, Korean-made ginseng and ginseng products become matters of interest.

Ginseng may be classified into three types, i.e., fresh ginseng maintaining its original shape, red ginseng and white ginseng, depending on kinds of processing methods. Fresh ginseng, which is non-processed ginseng harvested in the field, contains about 75% of water, and thus may be easily decomposed and damaged during a process of circulation. Therefore, it is difficult to store fresh ginseng for a long time without using any special storage equipments or packages.

Generally, red ginseng is obtained by steaming fresh ginseng still having its shell, followed by drying. Red ginseng shows a light yellowish brown color or light reddish brown color. On the contrary, white ginseng is obtained by drying fresh ginseng, whose shell is removed or not, by sunlight, hot air, etc., in a non-boiled or non-steamed state. White ginseng has water content of about 13% and shows a milky white color or light yellow color. Additionally, white ginseng may be classified into unbent ginseng, semi-bent ginseng and bent ginseng, depending on shapes after drying.

Because ginseng having a great amount of vegetable fibers is not susceptible to grinding power compared to hard and brittle materials, it is difficult to prepare micropowder of ginseng in an industrial scale. Although several small-sized corporations are present in Korea for processing ginseng roots by a mechanical method to obtain ginseng powder, most of them depends on cutter mill, roll crusher and pin mill processes, thereby providing crude ground powder having an average particle diameter of about 150 μm. Therefore, most of the powder products are merely used in lower value-added applications, for example ginseng powder products or materials for ginseng cookies. Up to date, intensive research and development into methods for preparing high-quality ginseng powder have not been made.

Ginseng micropowder having an average particle diameter of 10 μm or less shows excellent dispersibility, miscibility and absorptiveness. Accordingly, such micropowder can be used in higher value-added applications, for example various health-aid foods or medicines such as drinks, tablets or capsules and cosmetic products such as functional skin care agents or skin packs. However, there is no epochal method for preparing ginseng micropowder via mechanical grinding.

Because ginseng contains a large amount of vegetable fibers and has a low hardness, there is a limitation in reducing the particle diameter of ginseng powder by merely applying grinding power to ginseng with a grinder. Moreover, according to such simple grinding methods, powder having a non-uniform particle size is obtained. Additionally, active components of ginseng may be degenerated or contaminated by the friction between ginseng and a grinder.

DISCLOSURE OF INVENTION

Technical Problem

Accordingly, the present invention has been made to solve the above-mentioned problems occurring in the prior art. According to the present invention, ginseng roots are ground crudely in order to facilitate micro-pulverization of ginseng, the crude ginseng powder is finely ground and the finely ground ginseng powder is further ultra-finely ground. By doing so, it is possible to obtain ginseng micropowder having a maximum particle diameter of 40 μm or less and an average particle diameter of less than 8 μm as well as showing a uniform particle size, while maintaining essential components unique to ginseng as they are. Therefore, the present invention is expected to contribute to development of new products and to promotion of health.

Therefore, it is an object of the present invention to provide a method for preparing micron-sized ginseng powder via a mechanical grinding process including the steps of grinding ginseng roots crudely, grinding the crude ginseng powder finely, and further grinding the ginseng powder ultra-finely.

Technical Solution

As described above, the present invention relates to a method for preparing micron-sized ginseng powder via mechanical grinding. More particularly, the present invention relates to a method for preparing micron-sized ginseng powder having a fine and uniform particle size, which is useful for manufacturing various health-aid foods or medicines such as drinks, tablets or capsules and cosmetic products such as functional skin care agents or skin packs, via a mechanical grinding process including systematic processing steps.

According to an aspect of the present invention, there is provided a method for preparing micron-sized ginseng powder, the method comprising the steps of: grinding ginseng roots crudely in order to facilitate micro-pulverization of ginseng; grinding the crude ginseng powder finely; and further grinding the ginseng powder ultra-finely.

The method according to the present invention is characterized in that ginseng roots are ground crudely prior to a step of finely grinding ginseng powder in order to facilitate micro-pulverization of ginseng; the step of finely grinding ginseng powder is performed under conditions developed so as to maximize the grinding efficiency while minimizing loss or contamination of active components due to the friction between ginseng powder and a grinding device such as a grinding container or ball mill; and micro-pulverized ginseng powder obtained from the above conditions is finally subjected to a jet mill to provide submicron-sized ultrafine powder, thereby increasing energy efficiency and cost efficiency.

ADVANTAGEOUS EFFECTS

The present invention can solve the above-mentioned problems and provide a novel method for preparing ginseng micropowder. The method according to the present invention is characterized in that ginseng roots are ground crudely prior to a step of finely grinding ginseng powder in order to facilitate micro-pulverization of ginseng; the step of finely grinding ginseng powder is performed under conditions developed so as to maximize the grinding efficiency while minimizing loss or contamination of active components due to the friction between ginseng powder and a grinding device such as a grinding container or ball mill; and micro-pulverized ginseng powder obtained from the above conditions is finally subjected to a jet mill to provide submicron-sized ultrafine powder, thereby increasing energy efficiency and cost efficiency.

DESCRIPTION OF DRAWINGS

FIG. 1 is a schematic flow chart showing a method for preparing ginseng micropowder according to the present invention;

FIG. 2 illustrates a jet mill grinding system applied to the ultrafinely grinding step as shown in FIG. 1;

FIG. 3 is a graph showing the particle size distribution of the ginseng micropowder obtained from Example 1 according to the present invention;

FIG. 4 is a graph showing the particle size distribution of the ginseng micropowder obtained from Example 2 according to the present invention; and FIG. 5 is a graph showing the particle size distribution of the ginseng micropowder obtained from Example 3 according to the present invention.

BEST MODE FOR CARRYING OUT THE INVENTION

Reference will now be made in detail to the preferred embodiments of the present invention. It is to be understood that the following examples are illustrative only and the present invention is not limited thereto.

Hereinafter, the method for preparing ginseng powder according to the present invention will be explained in more detail with reference to FIG. 1.

Ginseng used as starting material in the method according to the present invention includes white ginseng obtained by drying fresh ginseng, whose shell is removed or not, by sunlight, hot air, etc., in a non-boiled or non-steamed state, and red ginseng obtained by steaming fresh ginseng still having its shell, followed by drying.

First, ginseng as starting material is ground crudely to an average particle diameter of between 140 μm and 150 μm by using a high-speed rotation type impact grinder such as a cross beater mill as shown in ① and ② of the flow chart of FIG. 1. Herein, the inner wall of a grinding chamber and liner of a rotor is preferably made of stainless steel or high-purity alumina in order to prevent contamination.

Next, the crude ginseng powder obtained from the preceding step is finely ground to an average particle diameter of between 18 μm and 20 μm under dry atmosphere by using a grinder such as a vibration mill or attrition mill (see, ③ in FIG. 1). Such grinders are generally composed of a cylindrical container and grinding media (balls or rods). More particularly, balls are introduced into the container and the container or agitator is rotated to carry out grinding of ginseng between one ball and another ball or between the inner wall of the container and balls. Preferably, grinding time ranges from 1 hour to 3 hours, frequency of a vibration mill is 1000 vpm and rotation speed of the agitator of an attrition mill is 400 rpm.

However, when such types of attrition mills are used, it is necessary to perform lining of the parts (i.e., container, balls, etc.) to be in contact with ginseng powder by using zirconium oxide or high-purity alumina so that contamination caused by abrasion can be prevented. For example, alumina balls having a diameter of 5~15 mm φ may be used.

Additionally, it is preferable that the volume ratio of ginseng powder subjected to the finely grinding step to the balls is 25~40:50~60. If an excessively small amount of ginseng powder is charged into the finely grinding step, impact/frictional force generated between one ball and another ball or between the inner wall of the container and balls increases, resulting in contamination of the resultant product. On the other hand, when an excessively large amount of ginseng powder is charged into the finely grinding step, grinding quality is degraded by cushioning effect of the ginseng powder, etc. Then, the finely ground ginseng powder obtained from the preceding step using a vibration mill or attrition mill is further ground ultra-finely to an average particle diameter of less than 8 μm by using a jet mill (see, ④) in FIG. 1).

Because ginseng tissues contain a large amount of vegetable fibers, it is not possible to obtain ginseng powder having a particle diameter of several micrometers or less by using a general vibration mill or attrition mill. In general, a jet mill is used in micro-pulverization of metals, ceramics, ink, etc. It is not known that a jet mill is used and commercialized for grinding foods, particularly ginseng. When ginseng is ground by using a jet mill, it is possible to obtain ginseng powder having a particle diameter of several micrometers. Additionally, a jet mill has high cooling efficiency and thus is suitable for grinding low-melting and heat-liable materials. It is the mechanism of grinding by a jet mill that material particles moving along with circulating air flow are accelerated by the dynamic energy of pressurized air ejected from a plurality of ultra-sound velocity nozzles (grinding nozzles) and such accelerated particles come into collision, thereby accomplishing grinding of material particles.

A jet mill includes a classification chamber in addition to a grinding chamber and crude powder classified in the classification chamber is returned back to the grinding nozzle through a resending duct. Therefore, it is possible to obtain a powder product having a narrower particle size distribution, i.e., having a uniform particle size.

Further, in order to evaluate a technical possibility of particle size of ginseng powder being controlled to a sub-micron region (average particle diameter≦3 μm), grinding operation by a jet mill may be performed in the following three separate systems: (1) one-step sample feed/one-step grinding; (2) one-step sample feed/one-step grinding/one-step classification; and (3) two-step sample feed/two-step grinding (see, FIG. 2).

By using the method according to the present invention, it is possible to provide ginseng powder with a maximum particle diameter of ginseng micropowder of 40 μm or less and an average particle diameter of less than 8 μm. Particularly, by using grinding systems (2) and (3) of a jet mill, it is possible to control the average particle diameter of ginseng powder to a submicron level of around 3 μm.

Therefore, it is possible to efficiently control a particle size distribution of ginseng micropowder by using the method for preparing ginseng micropowder according to the present invention. Additionally, when viewed from the industrial view, the method has an advantage in that general high-speed rotation type impact grinders, attrition mills and high-speed air jet mills (jet mills) may be used as they are optionally with a slight modification (for example, use of stainless steel and lining with high-purity alumina at the parts to be in contact with ginseng powder).

Meanwhile, the method for preparing ginseng micropowder according to the present invention may be carried out either batchwisely or continuously.

Accordingly, the present invention provides a method for preparing micron-sized ginseng powder via mechanical grinding, by which the maximum particle diameter of the resultant ginseng powder can be controlled to 40 μm or less and the average particle diameter thereof can be controlled to less than 8 μm. As a result, the micron-sized powder obtained from the method of the present invention is useful for manufacturing various health-aid foods or medicines such as drinks, tablets or capsules and cosmetic products such as functional skin care agents or skin packs. Since the particle diameter limit recognizable by the human tongue is 20 μm, such micro-pulverized ginseng powder obtained by the method of the present invention can improve rough sensual characteristics of conventional ginseng powder. Additionally, according to the present invention, because ultrafinely ground ginseng powder has an increased surface area, thereby contributing to an increase in digestion/absorption ratio. Further, the method of the present invention uses a low-temperature grinding system, and thus prevents the loss of nutrients caused by heating and maintains flavor and color unique to ginseng.

MODE FOR THE INVENTION

Example 1

30 parts by volume of white ginseng powder (average particle diameter≈143 μm), which was preliminarily and crudely ground by using a cross beater mill, was charged into a vibration mill. At the same time, 60 parts by volume of alumina balls having a diameter of 15 mm φ were charged. The white ginseng powder was treated in the vibration mill under the conditions of an amplitude of 8.5 mm and a frequency of 1000 vpm for 3 hours to obtain powder having an average particle diameter of about 18 μm. The resultant powder was charged into a jet mill and subjected to system (1) as shown in FIG. 2, while controlling the sample feed amount to a range of between 3.4 and 8.6 kg/hrs, to obtain ginseng micropowder having a maximum particle diameter of about 26~40 μm and an average particle diameter of about 5.5~7.2 μm. The particle size distribution of the ginseng micropowder obtained from this example is shown in FIG. 3.

Example 2

25 parts by volume of red ginseng powder (average particle diameter≈148 μm), which was preliminarily and crudely ground by using a cross beater mill, was charged into an attrition mill. At the same time, 50 parts by volume of alumina balls having a diameter of 5 mm φ were charged. The red ginseng powder was treated in the attrition mill under the conditions of an agitator rotation speed of 400 rpm for 1 hour to obtain powder having an average particle diameter of about 19 μm. The resultant powder was charged into a jet mill and subjected to system (2) as shown in FIG. 2, while controlling the sample feed amount to an adequate range, to obtain sub-micron-sized ginseng micropowder having a maximum particle diameter of about 13 μm and an average particle diameter of about 3.7 μm. The particle size distribution of the ginseng micropowder obtained from this example is shown in FIG. 4.

Example 3

White ginseng and red ginseng micropowder obtained by treatment with a jet mill according to EXAMPLE 1 was ground again by using a jet mill, while controlling the sample feed amount to an adequate range (see, grinding system (3) in FIG. 2). By doing so, it was possible to obtain ginseng micropowder having a maximum particle diameter of about 8~10 μm and an average particle diameter of about 2.8~3.3 μm. The particle size distribution of the ginseng micropowder obtained from this example is shown in FIG. 5.

INDUSTRIAL APPLICABILITY

As described above, the ginseng micropowder obtained by the method according to the present invention has a maximum particle diameter of 40 μm or less, an average particle diameter of less than 8 μm and a uniform particle size. Therefore, the present invention is applicable to bio-industrial and medical fields. Particularly, the ginseng powder obtained by the method according to the present invention is useful for manufacturing various health-aid foods or medicines such as drinks, tablets or capsules and cosmetic products such as functional skin care agents or skin packs.

The invention claimed is:

1. A method for preparing micron-sized ginseng powder via mechanical grinding, which comprises the steps of:
   grinding ginseng roots crudely by using a cross beater mill to obtain crude ginseng powder having an average particle diameter of 140~150 μm;
   grinding the crude ginseng powder finely by using at least one selected from the group consisting of a vibration mill and attrition mill to obtain ginseng powder having an average particle diameter of 18~20 μm; and
   grinding the ginseng powder ultrafinely by using a jet mill to obtain ginseng micropowder having a maximum particle diameter of 40 μm or less and an average particle diameter of less than 8 μm.

2. The method for preparing micron-sized ginseng powder via mechanical grinding according to claim 1, wherein the ginseng powder is present in the finely grinding step in a volume ratio of ginseng powder to balls of 25~40:50~60.

3. The method for preparing micron-sized ginseng powder via mechanical grinding according to claim 1, wherein the balls used in a mill in the finely grinding step are alumina balls having a diameter of 5~15 mm φ.

4. The method for preparing micron-sized ginseng powder via mechanical grinding according to claim 1, wherein the finely grinding step is carried out for 1~3 hours under the condition of a frequency of 1000 vpm in the case of a vibration mill or an agitator rotation speed of 400 rpm in the case of an attrition mill.

5. The method for preparing micron-sized ginseng powder via mechanical grinding according to claim 1, wherein the jet mill used in the ultrafinely grinding step is operated in a system including a first step of feeding a sample, followed by grinding and classification, and a second step of feeding a sample, followed by grinding.

* * * * *